A. J. Peavey.
Saw-Set.
Nº 22,510. Patented Jan. 4, 1859.
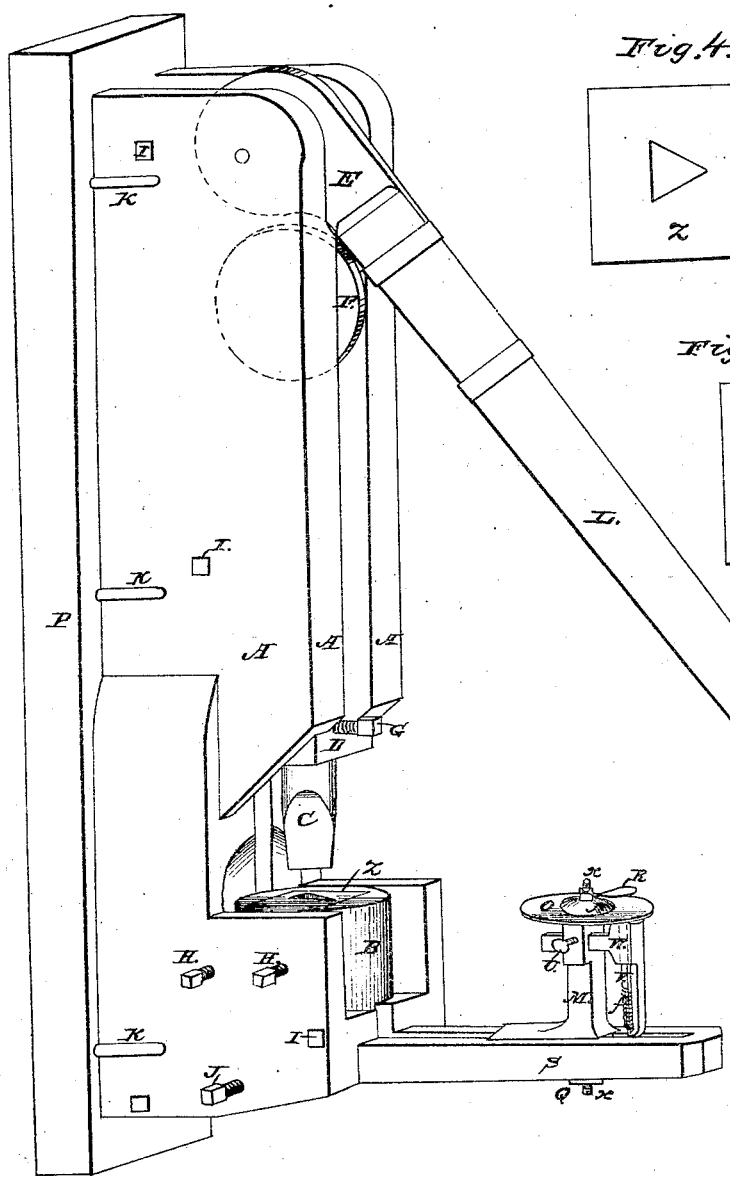

UNITED STATES PATENT OFFICE.

A. J. PEAVEY, OF SOUTH MONTVILLE, MAINE.

MACHINE FOR CUTTING AND PUNCHING IRON.

Specification of Letters Patent No. 22,510, dated January 4, 1859.

*To all whom it may concern:*

Be it known that I, A. J. PEAVEY, of South Montville, in the county of Waldo and State of Maine, have invented a new and improved machine for cutting and punching iron, &c., and for cutting teeth in all kinds of saws with a contrivance for holding circular saws of any size in such a manner as to make the teeth of uniform shape, of any desired length, and so that they will describe an exact circle.

To enable others skilled in the art to make and use my invention, I will now proceed to give the following, which I do hereby declare is a full and exact description thereof, reference being had to the accompanying drawings and to the letters of reference marked thereon.

Z, (Figures 1 and 4) represents a die, made of steel, and hardened, and may be made with a hole of any shape, according to the work to be done, (always having the puncher or cutter exactly fit the hole in the die) and of thickness to give it sufficient strength.

B, (Figs. 1, 2, and 3) represents a cylindrical, cast iron box, with a square hole entirely through it, and in one side, (Fig. 3) a square socket, in size just to receive the die, Z, and in depth a little less than the thickness of Z. The other side of B, (Fig. 2) for cutting iron, &c., has a groove corresponding in width with the hole through B, from which it extends to the periphery and of depth not exceeding one fourth of its width. This side of B has also an oblong socket across the opposite side of the square hole, into which fits the steel bar T, (Fig. 5,) whose thickness also a little exceeds the depth of its socket.

D, (Fig. 1) is a square plunger, of iron, with the roller or pulley F hung in one end, and in the other a round socket to hold the puncher or cutter, one of which, fitting the die Z, is represented by C. G is a screw to hold the cutter firmly in its socket. A A represent the body of the machine, which is also of iron, and has flanges above and below the plunger to keep it in place, and a circular cavity for the reception of the die box B, so that the center of B and of D may form a right line. H H are screws, which, with two others directly opposite hold B in its place, while it rests securely against the head of its cavity. The body or case of the machine, being in two parts, is held together securely by bolts marked I, and all fastened by bolts marked K to the plank P. E is an eccentric, also of iron, hung just behind the roller F, and is worked by the lever L, (which may be of wood and of any length, according to the desired power) to which it is fastened by bands. A small chain attached to the eccentric, just below its axis, and to the plunger draws the latter back between the strokes of the machine.

It will readily be seen that by turning the die box B, with the cutter C, saw teeth of various patterns may be cut with one triangular cutter and one die.

I do not claim the universal die box as such, but what I claim as my invention and desire to secure by Letters Patent is—

1. The cylindrical die box B in combination with the circular punch socket D, both punch and die being by their means capable of revolution upon their axes, and adjustment to the required angles of the teeth of the saw to be governed as herein specified.

I do not claim the dividing plate, and the parts necessary for its convenient operation nor operating the punches by lever and cam separately considered but I do claim—

2. The combination of the dividing plate O, and its appendages, substantially as described, with the punching apparatus in the manner, and for the purpose specified.

A. J. PEAVEY.

Witnesses:
JOHN RANDALL,
THOMAS J. PEAVEY.